United States Patent Office 3,098,058
Patented July 16, 1963

3,098,058
PROCESS FOR REACTING A DIOLEFINIC POLYMER WITH HEXACHLOROCYCLOPENTADIENE PRODUCTION OF NEW POLYMERIC COMPOSITIONS AND PRODUCTS THEREOF
George C. Schweiker and Arthur W. Carlson, Chicago, Ill., assignors to Velsicol Chemical Corporation, Chicago, Ill., a corporation of Illinois
No Drawing. Filed May 5, 1960, Ser. No. 26,930
16 Claims. (Cl. 260—45.5)

This invention relates to the production of new chlorine-containing polymeric material. In particular, this invention relates to polymeric material prepared by the adduction of hexachlorocyclopentadiene and a selected class of polymers.

A multitude of uses have become available for polymers, provided that they have the proper chemical and physical properties. These uses include the preparation of adhesives, coating materials, and the impregnation of fibers. One particularly valuable method of enhancing the value of these materials is the combination of heat stability and fire retardance. Often it is difficult to obtain a product containing both properties, since the por- of the composition contributing the fire retardance may be unstable at elevated temperatures.

Therefore, one object of the present invention is to produce polymeric material having superior fire retardance.

Another object of the present invention is the production of polymeric material which in addition to being fire retardant is stable at elevated temperatures.

Still another object of the present invention is the production of self-extinguishing compositions.

Other objects of the present invention will become apparent from the ensuing description.

Unexpectedly, it has been found that by reacting hexachlorocyclopentadiene and a substantially linear polymer prepared from a diolefin monomer, a new polymeric material is formed having superior fire retardance, being self-extinguishing, and in addition being stable at elevated temperatures. This is not often true with chlorinated material; generally, such materials are unstable at elevated temperatures, the chlorine atoms being removed by heat.

Further, the production of the present compositions was not expected since it has been found that hexachlorocyclopentadiene will not react to a sufficient degree with most polymeric materials so as to form products having high chlorine content. In accordance with the present process, stable products containing up to 60% chlorine can be formed. In order that this reaction will go forth to the proper extent, it has been found necessary that the polymeric reactant be substantially linear. When reaction of a polymer which contains substantial amounts of branching and is not substantially linear is attempted with hexachlorocyclopentadiene, insufficient or no reaction is obtained, depending upon the precise structure of the polymeric reactant. By "not substantially" is meant that the amounts of hexachlorocyclopentadiene which react do not produce products having sufficient chlorine so as to impart superior fire retardance and self-extinguishing properties to the final product.

The polymeric reactant of the present process as previously defined must be substantially linear and unsaturated. While this reactant can contain substituents in addition to carbon and hydrogen, hydrocarbon polymers are of particular value in the present invention. In order to have the necessary unsaturation present in this reactant, the polymer reactant should be prepared from a diolefin monomer. Preferred diolefin monomers for such use are those containing from 4 to 6 carbon atoms. Of particular importance, due to their availability and properties, are the following: butadiene, methyl butadiene, dimethyl butadiene, cyclohexadiene, cyclopentadiene, and methyl cyclopentadiene.

Various polymers can be obtained from these monomers, depending on the polymerization conditions. These condition variables include: type of catalyst, if any is used; polymerization temperature, time and pressure; monomer concentration; and polymer recovery procedure. Thus, in accordance with this invention, the various polymers of this classification, i.e., linear polymers prepared from a diolefin monomer, are operable, including copolymers thereof. Generally, the hydrocarbon polymers are the post useful since they are most easily produced with desirable properties at reasonable costs and, further, since the absence of additional substituents prevents any steric or other hindrance during the reaction. The molecular weight of the polymeric reactant can be varied so as to conform with desired properties of the product.

While all of the above described groups of polymeric materials are included within the present invention, for particular applications specific materials are of particular advantage. Thus, for example, a catalytically polymerized cyclopentadiene polymer has been found to be of extreme value in the production of compositions of the present invention. This material is prepared by maintaining a solution of cyclopentadiene at a low temperature, in the presence of boron trifluoride catalyst. Inert solvents, such as benzene, toluene, xylene, chloroform, and carbon tetrachloride, are needed to permit easy control of the reaction and to facilitate recovery of the product. A concentration of from about 20 to 35 percent by weight of cyclopentadiene has been found satisfactory so as to obtain polymer of desirable molecular weight. The catalyst can be used in the form of one of its complexes, such as the boron trifluoride-diethyl ether complex, the boron trifluoride-dimethyl ether complex, or in the form of its free gas. While the catalyst concentration can be varied, a suitable concentration is between about 0.1–0.5 weight percent of the complex. This polymer has a molecular weight of greater than about 25,000 and is benzene soluble.

This is only one of the many polymeric reactants useful in the production of the present invention. Thus, butadiene, methyl butadiene, cyclopentadiene, cyclohexadiene, and/or dimethyl butadiene can be polymerized in the absence of catalyst, but generally in these cases it is necessary to use quite high temperatures, at least above 150° F. In these instances the use of superatmospheric pressure is of importance in producing suitable polymers. In the production of catalytic polymers, in addition to boron trifluoride mentioned above, various other catalysts, including organic peroxides, metal oxides, and metallic sodium are used to prepare polymers useful as the reactant in the present process. By using various temperatures, pressures, catalysts, and monomer concentrations, the properties of the reactant are varied as required by the ultimate utility of the product.

It is to be understood that the present invention contemplates reacting hexachlorocyclopentadiene and the previously described "substantially linear polymer." Thus, all of the polymers falling within this class are within the present scope.

In conducting the process for preparing the new products of the present invention, hexachlorocyclopentadiene and the "polymeric reactant" are mixed together at an elevated temperature and in the presence of an inert solvent. The physical properties of the polymer before and after reaction make the use of solvent desirable so as to allow for the desired high degree of reaction, for ease in controlling the course of reaction, and for recovery of the product. Various solvents can be used, provided that they have the necessary solubility characteristics and are inert to the reaction. While the specific polymer utilized will dictate the preferred solvent, aromatic solvents, such as benzene, toluene, and xylene, and chlorinated aliphatic solvents, such as chloroform and carbon tetrachloride are suitable.

In order to obtain the necessary reaction, elevated reaction temperatures must be employed. Again, the optimum temperature will depend upon the specific "reactant polymer," and also upon the specific solvent, solvent concentration, and the desired degree of reaction. Generally, temperatures between about 50° C. and about 250° C. are satisfactory, although temperatures between about 100° C. and 200° C. are preferred. While the reaction will proceed normally under atmospheric pressure, superatmospheric pressure can be used. Similarly, conducting the reaction as a continuous process, rather than as a batch operation, is advantageous and is an embodiment of the present process.

While not mandatory, it is preferred to perform the present reaction under a blanket of an inert gas, such as nitrogen, to prevent undesired oxidation. Similarly, there can be incorporated into the reaction mixture an inert anti-oxidant. Still another valuable although not absolutely necessary additive is an acid scavenger so as to prevent detrimental reactions by acid, principally hydrochloric acid formed in trace amounts during the reaction. As in the case of the anti-oxidant, the scavenger must be inert to the reaction mixture.

In accordance with the present invention, in order that the products contain sufficient chlorine, it is necessary that from about 10 to about 100% of the theoretical amount of hexachlorocyclopentadiene react, it being preferred to react at least 20% and it is satisfactory to react from about 20% to about 70% of the theoretical amount of hexachlorocyclopentadiene. The theoretical amount of hexachlorocyclopentadiene is based on the unsaturation present in the polymeric reactant.

In performing the reaction, the actual ratio of reactants is not critical since the use of lesser amounts of hexachlorocyclopentadiene can be compensated for by varying the reaction conditions, including lengthening the reaction time. A minimum of 0.2 mole of hexachlorocyclopentadiene per aliphatic double bond present in the polymeric reactants is necessary to obtain a reasonable rate of reaction with higher ratios, such as from about 1 to 5 moles of hexachlorocyclopentadiene per mole of aliphatic unsaturation being preferred.

Due to the unsaturation of the reactants it is desirable to perform the reaction in an antioxidation atmosphere. As previously mentioned, this can be readily accomplished by performing the reaction under a blanket of relatively inert gas and/or by the incorporation of anti-oxidants into the reaction mixture.

The following examples are set forth for the purpose of illustration but not limitation. It will be understood that in each example there can be substituted for the "polymeric reactant" other such materials falling within the previously described scope of this reactant. In the examples, phenylglycidyl ether was used as an acid scavenger and di-t-butyl-p-cresol as an anti-oxidant.

*Example 1*

The following is an example of the production of substantially linear polymer from cyclopentadiene:

The reactor used in this production was a cascaded three-stage mild steel reactor (each stage 2-gallon capacity) fitted with brine-cooled jackets and a mechanical stirrer. This reactor was connected via metered lines to a pair of 2-gallon capacity tanks, one charged with 0.18 percent by weight of boron trifluoride-ether complex (based on weight of cyclopentadiene) in xylene, and the other charged with brine-cooled, freshly-distilled cyclopentadiene. These two streams were then metered simultaneously into the first stage of the reactor, the former at 5.0 gallons per hour and the latter at 2.5 gallons per hour. The reaction mixture in the second stage of the reactor was stirred and maintained at a temperature of about 50° F. by brine cooling. The reaction was complete in about 45 minutes and the product which was continuously withdrawn from the third stage of the reactor, contacted with ten percent by weight of dry solid sodium carbonate and centrifuged.

*Example 2*

Hexachlorocyclopentadiene (288 grams; 1.0 mole), cyclopentadiene resin as prepared in Example 1 [(33 grams, 0.5 mole of cyclopentadiene units) dissolved in xylene (231 grams)], phenyl glycidyl ether (1 gram), and di-t-butyl-p-cresol (0.3 gram) were placed in a three-necked glass reaction flask equipped with reflux condenser, thermometer, heating mantle, and nitrogen inlet tube. The reaction mixture was heated to about 125°–145° C. under a blanket of nitrogen gas for about 16 hours. Upon cooling, the desired reaction product was then obtained by precipitaiton by pouring into methanol, and dried. This product was found to be soluble in xylene and carbon tetrachloride.

Films were cast from a solution of 15 grams of the above product dissolved in toluene (85 grams). The films showed good adhesion and flexibility, as well as hardness.

Three grams of this product were placed in an oven set at 100° C. for one week. The sample weighed the same after the treatment as it did initially, thus showing it to be heat stable. Further, there was no evidence of hydrochloric acid evolution or of cross-linking, the product still being readily soluble in xylene.

Elemental analysis of the reaction product showed it to have a chlorine content of 45.3%, representing a reaction of 33% of the theoretical number of double bonds in the cyclopentadiene polymer.

*Example 3*

A solution of 13.7 percent by weight polymer of the type described in Example 1 (35.6 grams containing 5 grams of polymer, 0.076 mole of cyclopentadiene units) in xylene solvent, and hexachlorocyclopentadiene (20.7 grams; 0.076 mole) were placed in a three-necked glass reaction flask equipped with stirrer, thermometer, reflux condenser, and heating mantle. This mixture was heated to reflux, 140° C., and maintained there for 16½ hours. Then it was taken up in xylene, poured into methanol, and then precipitated, filtered and dried with the desired adduction product being recovered. Specific viscosities at 25° C. in varying concentrations in xylene solution were found to be 0.173 (1% concentration), 0.079 (0.5%), 0.040 (0.25%) and 0.021 (0.125%). It was found to be highly soluble in carbon tetrachloride, toluene, and xylene. Its chlorine content was 32%.

*Example 4*

A xylene solution of 13.7 percent by weight of the cyclopentadiene polymer (35.6 grams, containing 5 grams of polymer, 0.076 mole of cyclopentadiene units) and hexachlorocyclopentadiene (62.1 grams, 0.228 mole), phenyl glycidyl ether (1 gram) and di-t-butyl-p-cresol (50 milligrams) were placed in a glass reaction flask equipped with stirrer, thermometer, reflux condenser, and heating mantle. This mixture was heated to reflux (140° C.) under a nitrogen atmosphere for 16 hours. After cooling, xylene was added, poured into acetone, and the desired product precipitated therefrom. It was washed with acetone, filtered, and dried, giving a tan-colored product. Its specific viscosity at 25° C. in varying concentrations (xylene solvent) was found to be 0.242 (1% concentration), 0.183 (0.8%), 0.133 (0.6%), 0.088 (0.4%), and 0.044 (0.2%). Analysis showed it contained 47.7% chlorine. Its percent loss of chlorine after being heated at 100° C. for one week was 1.6%, showing superior thermal stability.

Example 5

A solution of 13.7 percent by weight of the cyclopentadiene polymer (35.6 grams containing 5 grams of polymer, 0.076 mole of cyclopentadiene units) and hexachlorocyclopentadiene (62.1 grams, 0.228 mole), phenyl glycidyl ether (3 grams), and di-t-butyl-p-cresol (50 milligrams) were placed in a glass reaction flask equipped with stirrer, thermometer, reflux condenser, and heating mantle. This mixture was heated and a sufficient amount of the xylene was removed so as to raise the reflux temperature to 170° C. Then the reaction mixture was maintained at this temperature under a nitrogen atmosphere for 18 hours. At that time the xylene was removed by distillation and the product was precipitated by pouring into acetone, washed, filtered, and dried. Analysis showed the chlorine content of the product to be 54%. This indicates that 55% of the theoretical double bonds had been reacted. After heating at 100° C. for one week no loss of chlorine was evidenced.

Example 6

A xylene solution of polybutadiene (0.1 mole of butadiene units) is placed in a glass reaction flask equipped with stirrer, thermometer, reflux condenser, and heating mantle and containing hexachlorocyclopentadiene (27.3 grams, 0.1 mole), phenyl glycidyl ether (1 gram) and di-t-butyl-p-cresol (50 milligrams). This mixture is heated to reflux and maintained at that temperature for 16 hours under a nitrogen atmosphere. Then the xylene is removed by distillation, the product is precipitated by pouring into acetone, washed, filtered, and dried.

Example 7

A xylene solution of polymethylbutadiene (0.1 mole of methylbutadiene units) is placed in a glass reaction flask equipped with stirrer, thermometer, reflux condenser, and heating mantle and containing hexachlorocyclopentadiene (54.6 grams, 0.2 mole), phenyl glycidyl ether (1 gram), and di-t-butyl-p-cresol (50 milligrams). This mixture is heated to reflux and maintained there for 16 hours under a nitrogen atmosphere. Then the xylene is removed by distillation, the product is precipitated by pouring into acetone, washed, filtered, and dried.

Example 8

A xylene solution of polydimethylbutadiene (0.1 mole of dimethylbutadiene units) is placed in a glass reaction flask equipped with stirrer, thermometer, reflux condenser, and heating mantle and containing hexachlorocyclopentadiene (27.3 grams, 0.1 mole), phenyl glycidyl ether (1 gram) and di-t-butyl-p-cresol (50 milligrams). This mixture is heated to reflux and maintained at that temperature for 16 hours under a nitrogen atmosphere. Then the xylene is removed by distillation, the product is precipitated by pouring into acetone, washed, filtered, and dried.

Example 9

A xylene solution of polymethylcyclopentadiene (0.1 mole of methylcyclopentadiene units) is placed in a glass reaction flask equipped with stirrer, thermometer, reflux condenser, and heating mantle and containing hexachlorocyclopentadiene (27.3 grams, 0.1 mole), phenyl glycidyl ether (1 gram) and di-t-butyl-p-cresol (50 milligrams). This mixture is heated to reflux and maintained at that temperature for 16 hours under a nitrogen atmosphere. Then the xylene is removed by distillation, the product is precipitated by pouring into acetone, washed, filtered, and dried.

Example 10

A xylene solution of polycyclohexadiene (0.1 mole of pentadiene units) is placed in a glass reaction flask equipped with stirrer, thermometer, reflux condenser, and heating mantle and containing hexachlorocyclopentadiene (27.3 grams, 0.1 mole), phenyl glycidyl ether (1 gram) and di-t-butyl-p-cresol (50 milligrams). This mixture is heated to reflux and maintained at that temperature for 16 hours under a nitrogen atmosphere. Then the xylene is removed by distillation, the product is precipitated by pouring into acetone, washed, filtered, and dried.

The polymeric material produced by the process described herein has utility in a wide variety of applications. For instance, due to its unusual and unexpected solubility in the common aromatic solvents, solutions of the material in these solvents find extreme usefulness as laminating agents, adhesives, surface coatings, impregnating agents, and the like. As impregnating agents, these solutions may be used to impregnate such materials as cloth, fibers, asbestos, mica, paper, etc. As a laminating agent these solutions may be spread upon one sheet to be joined, a portion of the solvent removed to increase the viscosity, and then the first sheet joined to a second sheet upon the application of heat and pressure to remove the remaining solvent and bind the two sheets to the polymeric material.

The polymeric material of this invention is especially useful as a result of its heat stability and fire retardant properties. The heat generated in transformer coils and in various similar electrical apparatus, such as circuit breakers, motors, etc., often creates highly undesirable effects on the apparatus. A few of these effects are the melting of insulating and spacing material, the changing of the characteristics of the apparatus through the change of the physical properties, such as dielectric constant of the insulating parts, and even the physical burning of the apparatus as a result of flames created by burning insulation and spacing material. The use of the polymeric material described herein prevents these undesirable effects due to its thermal stability and fire retardance. Furthermore, since the polymeric material of this invention is easily impregnated into paper and fibrous material, electrical insulation can be produced therefrom which retains the desirable properties of the presently used insulating materials and eliminates the undesirable properties of low thermal stability and low fire resistance.

We claim:

1. A process for the production of new chlorine-containing, xylene-soluble, polymeric compositions of matter which comprises heating a reaction mixture consisting substantially of a substantially linear unsaturated hydrocarbon homopolymer prepared from a hydrocarbon diolefinic monomer selected from the group consisting of butadiene, methyl butadiene, dimethyl butadiene, cyclohexadiene, cyclopentadiene and methyl cyclopentadiene and a minimum of about 0.2 moles of hexachlorocyclopentadiene per unit of unsaturation of said polymeric reactant by heating them in a relatively inert solvent.

2. A process for the production of new chlorine-containing, xylene-soluble, polymeric compositions of matter which comprises heating a reaction mixture consisting substantially of a substantially linear unsaturated homopolymer prepared from a diolefinic hydrocarbon monomer selected from the group consisting of butadiene, methyl butadiene, dimethyl butadiene, cyclohexadiene, cyclopentadiene and methyl cyclopentadiene and from about 0.2 to about 5 moles of hexachlorocyclopentadiene per unit of unsaturation of said polymer until from about 10% to about 100% of the theoretical amount of hexachlorocyclopentadiene has reacted.

3. A process for the production of new chlorine-containing, xylene-soluble, polymeric compositions of matter which comprises heating a reaction mixture consisting substantially of a substantially linear unsaturated homopolymer prepared from a diolefinic hydrocarbon monomer selected from the group consisting of butadiene, methyl butadiene, dimethyl butadiene, cyclohexadiene, cyclopentadiene and methyl cyclopentadiene and a minimum of 0.2 mole of hexachlorocyclopentadiene per unit of unsaturation of said polymeric reactant at a temperature between about 50° C. and about 250° C. and in an inert solvent until from about 20 to about 100% of the theoretical amount of hexachlorocyclopentadiene has reacted.

4. A process for the production of new chlorine-containing, xylene-soluble, polymeric compositions of matter which comprises heating a reaction mixture consisting substantially of a substantially linear, unsaturated homopolymer of cyclopentadiene and a minimum of 0.2 mole of hexachlorocyclopentadiene per unit of unsaturation of said polymer in an inert solvent at a temperature between about 50° C. and about 250° C. until from about 20% to about 100% of the theoretical amount of hexachlorocyclopentadiene has reacted.

5. A process for the production of new chlorine-containing, xylene-soluble, polymeric compositions of matter which comprises heating a reaction mixture consisting substantially of a substantially linear, unsaturated homopolymer of cyclohexadiene and a minimum of 0.2 mole of hexachlorocyclopentadiene per unit of unsaturation of said polymer in an inert solvent at a temperature between about 50° C. and about 250° C. until from about 20% to about 100% of the theoretical amount of hexachlorocyclopentadiene has reacted.

6. A process for the production of new chlorine-containing, xylene-soluble, polymeric compositions of matter which comprises heating a reaction mixture consisting substantially of a substantially linear, unsaturated homopolymer of butadiene and a minimum of 0.2 mole of hexachlorocyclopentadiene per unit of unsaturation of said polymer in an inert solvent at a temperature between about 50° C. to about 250° C. until from about 20% to about 100% of the theoretical amount of hexachlorocyclopentadiene has reacted.

7. A process for the production of new chlorine-containing, xylene-soluble, polymeric compositions of matter which comprises heating a reaction mixture consisting substantially of a substantially linear, unsaturated homopolymer of methyl butadiene and a minimum of 0.2 mole of hexachlorocyclopentadiene per unit of unsaturation of said polymer in an inert solvent at a temperature between about 50° C. and about 250° C. until from about 20% to about 100% of the theoretical amount of hexachlorocyclopentadiene has reacted.

8. A process for the production of new chlorine-containing, xylene-soluble, polymeric compositions of matter which comprises heating a reaction mixture consisting substantially of a substantially linear, unsaturated homopolymer of methylcyclopentadiene and a minimum of 0.2 mole of hexachlorocyclopentadiene per unit of unsaturation of said polymer in an inert solvent at a temperature between about 50° C. and about 250° C. until from about 20% to about 100% of the theoretical amount of hexachlorocyclopentadiene has reacted.

9. Product of the process of claim 1.
10. Product of the process of claim 2.
11. Product of the process of claim 3.
12. Product of the process of claim 4.
13. Product of the process of claim 5.
14. Product of the process of claim 6.
15. Product of the process of claim 7.
16. Product of the process of claim 8.

References Cited in the file of this patent

UNITED STATES PATENTS 2,720,499    Doak _____ Oct. 11, 1955